INVENTOR.
JOHN I. SCHAEFFER
BY Edwin D. Grant
ATTORNEY

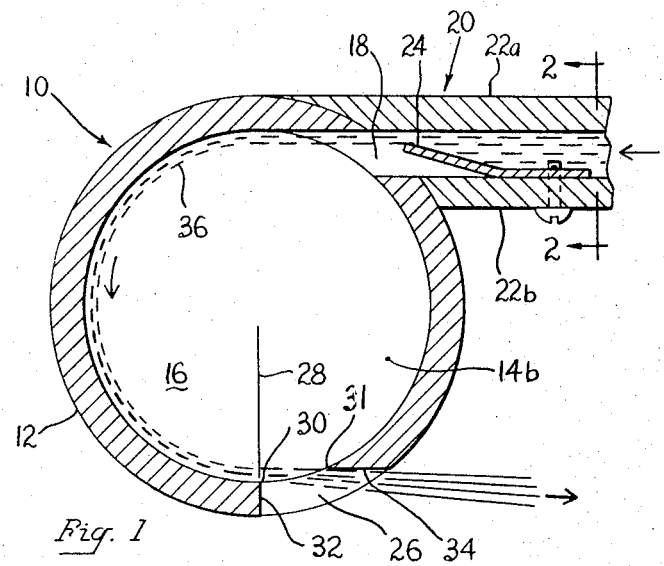
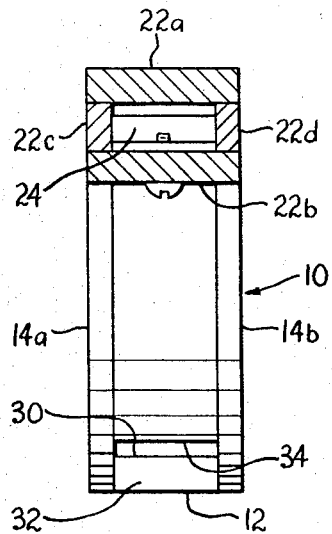
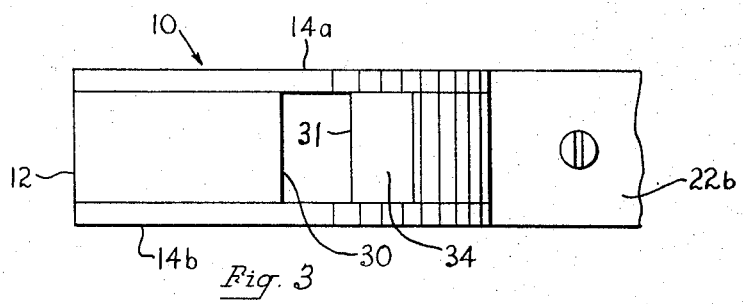
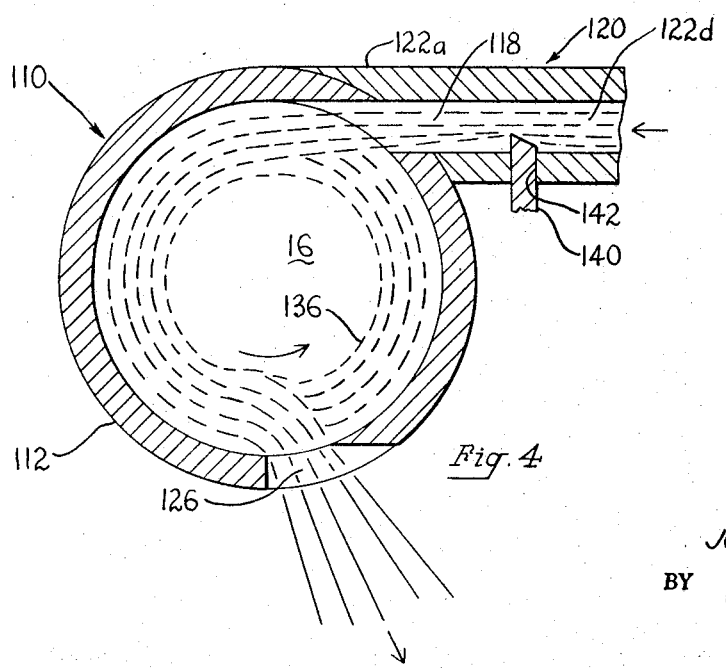

United States Patent Office 3,452,934
Patented July 1, 1969

3,452,934
FLUID INJECTORS
John I. Schaeffer, Towaco, N.J., assignor to Thiokol Chemical Corporation, Bristol, Pa., a corporation of Delaware
Filed Sept. 28, 1966, Ser. No. 582,637
Int. Cl. F02k 1/22
U.S. Cl. 239—464                                 4 Claims

ABSTRACT OF THE DISCLOSURE

A fluid injector characterized by a tangential inlet disposed in a housing of circular cross section and an outlet shaped so that its inner edges are separated in a radial direction by a distance which is less than the distance therebetween in a direction normal thereto.

---

This invention relates to fluid injectors and, more particularly, to fluid injectors capable of injecting jet streams at high injection velocities over a wide range of flow rates and also capable of providing different injection angles relative to the outlets of the fluid injectors.

In certain apparatus, such as rocket motors, it is advantageous to direct two or more jet streams into impingement within a combustion chamber in such a manner that the locus and angle of impingement of the jet streams can be varied. Although pivotally mounted nozzles can be employed to accomplish this result, such injectors are complicated in construction and also often become immovable when exposed to high-temperature, corrosive environments. Furthermore, since the throat of a conventional nozzle has a certain fixed cross-sectional area, the velocity of fluid discharged through the nozzle is proportionate to the mass flow rate of the fluid. It is often desirable, however, to inject a fluid into a combustion chamber at a high velocity over a wide range of flow rates. Thus there has been a need for fluid injectors which are uncomplicated in construction, reliable in operation, and capable of directing a jet stream at different angles into a combustion chamber and at high velocities over a wide range of flow rates.

It is accordingly an object of this invention to provide fluid injectors capable of injecting jet streams at different angles relative to the fixed outlets thereof.

Another object of the invention is to provide a high injection velocity of a liquid propellant into the combustion chamber of a rocket motor over a wide range of flow rates.

A further object of the invention is to provide variable-flow fluid injectors that are uncomplicated in design and thus inexpensive to manufacture and reliable in operation.

These and other objects of this invention are attained by fluid injectors each of which comprises a cylindrical housing which is provided with at least one inlet through which fluid can be injected circumferentially of the inner surface of the housing, and with at least one outlet disposed in the path of fluid injected into the housing and shaped so that fluid can be discharged therethrough in different directions. Preferred embodiments of the invention are also provided with flow control means for varying the flow area of the aforementioned inlet.

The invention will be readily understood by consideration of the following description of several embodiments thereof, reference being taken to the accompanying drawings wherein:

FIGURE 1 is a cross-sectional view illustrating a first embodiment of the invention;

FIGURE 2 is a view of the embodiment of FIGURE 1 taken along the plane represented by line 2—2 in that drawing;

FIGURE 3 is a view of the same embodiment, as seen from below the embodiment in its illustrated position in FIGURE 1;

FIGURE 4 is a cross-sectional view of a modification of the embodiment of FIGURE 1, illustrating the discharge of a jet stream therefrom at an angle different from that shown in FIGURE 1;

Throughout the specification and drawings, like reference numbers designate like parts.

Figure 6:
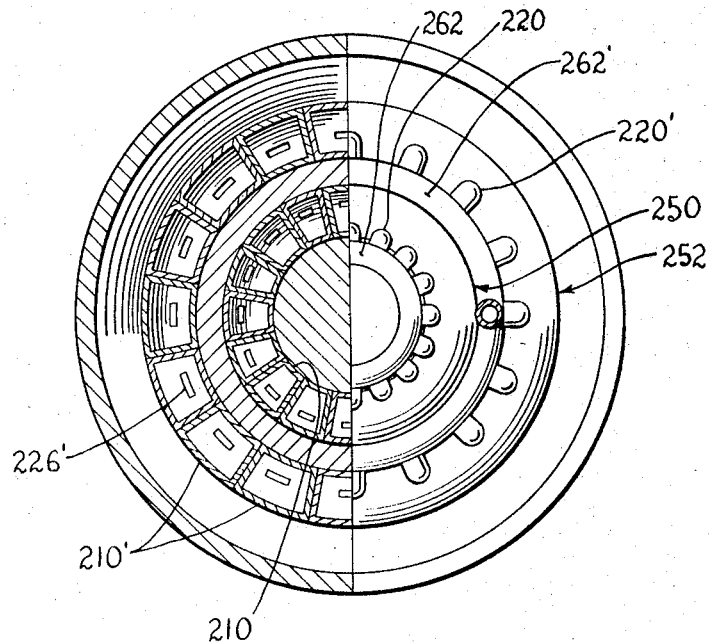
FIGURE 6 is a view of the embodiment of FIGURE 5 taken along the two planes represented by the offset line 6—6 in that drawing.

In the embodiment of the invention illustrated in FIGURES 1, 2 and 3, the number 10 generally designates a housing comprising a cylindrical portion 12 the ends of which are closed by means of end plates 14a, 14b so as to form a chamber 16 of circular cross-section. An inlet 18 extends through the wall of portion 12 of housing 10, this inlet being disposed tangential to chamber 16 so that fluid injected therethrough is directed circumferentially of the latter. Fixedly joined to housing 10 and axially aligned with inlet 18 is a conduit 20 having four sides 22a through 22d. Preferably conduit 20 is provided with flow control means in the form of a leaf spring 24 one end of which is fixedly secured to the inner surface of side 22b thereof and the other end of which is disposed oblique to the longitudinal axis of the conduit. As illustrated in FIGURE 2, the side edges of leaf spring 24 slidably abut the inner surfaces of sides 22c and 22d, respectively, of conduit 20. An outlet 26 also extends through the wall of portion 12 of housing 10, this outlet being shaped so that the distance between the projections of its inner edges (i.e., edges 30 and 31) on a plane 28 (represented in FIGURE 1 by the line designated by the same number) radial to the upstream inner edge 30 is less than the distance between the projections of the same edges on a plane normal to the aforesaid plane 28. For the presently described embodiment of the invention, the projections of inner edges 30 and 31 would appear on the aforesaid plane 28 and on the plane normal thereto as said edges appear in FIGURES 2 and 3 respectively. More particularly, in the illustrated embodiment of the invention the outlet 26 is in the form of a slot that extends between the inner surfaces of end plates 14a and 14b, one planar wall 32 of the slot extending radially of the cylindrical portion 12 of housing 10 and the other planar wall 34 of the slot being disposed perpendicular to wall 32 and spaced from a plane tangent to the inner surface of said portion 12 at the inner edge 30 of the outlet. Although in the embodiment of the invention illustrated in FIGURES 1 and 2 the outlet 26 is disposed approximately 180° from the inlet 18 of housing 10 (i.e., relative to the fluid flow path between these orifices), the spacing between the outlet and inlet can be different in other embodiments of the invention. It will be obvious that the aforementioned components of the fluid injector illustrated in FIGURES 1 and 2 can be made of many different metals or other materials.

Conventional pump means (not shown) are connected to conduit 20 for forcing a fluid 36 under high pressure through the conduit and into chamber 16 of housing 10. The position of the free end of leaf spring 24 will depend upon the pressure of the fluid within conduit 20. That is, when the pressure of the fluid injected into the conduit is relatively low, the free end of the leaf spring will be near the inner surface of side 22a of the conduit, and the cross-sectional flow area of inlet 18 will be small. Consequently, the velocity of fluid entering chamber 16 will be higher than it would be if the free end of leaf spring 24 were farther from side 22a under the same fluid pressure. When the fluid pressure in conduit 20 is increased, leaf spring 24 is deflected in the direction of side 22b of the conduit, thus increasing the cross-sectional flow area of inlet 18. However, the velocity of fluid entering chamber 16 remains high because the pressure within conduit 20 is higher than it was when the cross-sectional flow area of inlet 18 was smaller. Thus the velocity of the fluid injected into the housing remains high over a wide range of flow rates. As illustrated in FIGURE 1, at a lower pressure the injected fluid 36 forms a thin film on the inner surface of housing 10 as it flows toward outlet 26. Below a particular fluid injection pressure, the thickness of the stream of fluid will be such that all of the fluid is discharged from outlet 26 along a path substantially tangent to inner surface of housing 10 at the upstream edge 30 of the outlet. If the fluid injection pressure is raised above this particular pressure, the increased flow through inlet 18 results in an increase in the thickness of the stream between the inlet and outlet 26, and a portion of the injected fluid will not escape through the outlet but instead will continue to flow around the housing. Momentarily the flow into housing 10 will exceed the flow from the housing. However, flow equilibrium is rapidly achieved because as the thickness of the stream on the wall of housing 10 increases (for example, to that thickness illustrated in FIGURE 4), the pressure within chamber 16 increases and thus fluid flow through outlet 26 also increases until it equals the flow rate through inlet 18. The direction of the fluid discharged through outlet 26 varies as the thickness of the stream on the wall of housing 10 is increased, as is also illustrated in FIGURE 4. The maximum flow possible occurs when the pressure in chamber 16 is of sufficient magnitude to cause the fluid to flow out of outlet 26 in an essentially radial direction with respect to the cylindrical wall of housing 10. At flow rates between those represented by the thickness of the stream in FIGURES 1 and 4, the direction of fluid discharge is at some angle between the illustrated flow directions. At both lower and higher fluid injection pressures within conduit 20, the velocity of the jet stream discharged through outlet 26 is relatively high, which is advantageous because impingement of the jet stream with another high-velocity jet stream produces more thorough mixing of the two streams than could be obtained with at lower velocities. It will be recognized that two or more of the described fluid injectors can be mounted around the periphery of the combustion chamber of a rocket motor, or other apparatus, so that jet streams discharged from the outlets 26 thereof will impinge, and also so that the point of impingement of said jet streams can be vraied by changing the fluid pressure in the conduits 20 of the fluid injectors to thereby direct the discharged fluid at different angles with respect to the outlets 26.

The construction of a second embodiment of the invention illustrated in FIGURE 4 is identical to that of the first-described embodiment except that conduit 120 is provided with flow control means in the form of a baffle 140 that is slidably engaged within a slot 142 in the wall of the conduit. The sides of baffle 140 respectively slidably abut the inner surfaces of the sides of conduit 120 that are disposed vertically in the drawing (only the one vertical side 122d being shown in FIGURE 4), and hence movement of the baffle toward or away from side 122a varies the flow area of inlet 118 of the fluid injector. As in the case of the first-described embodiment, the direction of discharge of fluid 136 from the outlet 126 of the fluid injector can thus be controlled by selection of the flow area of inlet 118. However, the flow area of inlet 18 of the first embodiment is varied by means of fluid pressure in conduit 20, whereas in the second embodiment the pressure in conduit 120 can be kept constant and the flow area of inlet 118 varied by movement of baffle 140.

Figure 5:
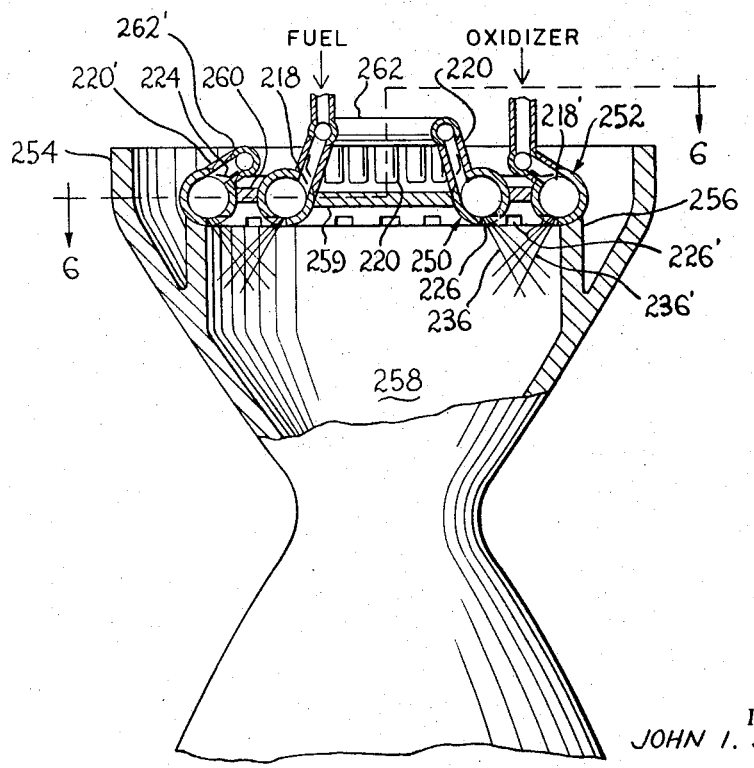
FIGURE 5 is a partially fragmentary, partially cross-sectional view illustrating a third embodiment of the invention as employed in a rocket motor.

FIGURES 5 and 6 illustrate a third embodiment of the invention comprising first and second toroidal housings respectively designated by the numbers 250, 252 and each formed of a plurality of cylindrical housing segments 210, 210′ which, except for being curved so that when placed end to end they form a torus, are identical to housings 10 and 110 of the previously described fluid injectors. Housings 250, 252 are fixedly mounted within the aft end of the casing 254 of a rocket motor, and more specifically, are attached to the forward end of a cylindrical member 256 which forms the combustion chamber 258 of the rocket motor. Second housing 252 is concentrically disposed around first housing 250, and a disk 259 and ring 260 close the forward end of combustion chamber 258. As illustrated in FIGURE 6, each housing segment 210′ is radially aligned with a respective one of the housing segments 210 of first housing 250. Furthermore, the inlets 218′ in second housing 252 are radially aligned with respective ones of the inlets 218 in first housing 250, and the outlets 226′ in second housing 252 are radially aligned with respective ones of the outlets 226 in first housing 250 (See FIGURE 5, in which typical ones of the inlets 218, 218′ and outlets 226, 226′ can be seen). The fluid injector is also provided with a first toroidal manifold 262, a plurality of conduits 220 each communicating a respective one of the inlets 218 with manifold 260, a second toroidal manifold 262′, and a plurality of conduits 220′ each communicating a respective one of the inlets 218′ with manifold 262. Conventional pump means (not shown) are connected to manifold 262 for forcing liquid fuel into the manifold and through conduits 220 into each of the housing segments 210 of first housing 250. A jet stream 236 is thus discharged from each outlet 226 of first housing 250 (only two of these jet streams being shown in FIGURE 5 so as to simplify the drawing). Likewise, conventional pump means (not shown) are connected to manifold 262′ for forcing liquid oxidizer into the manifold and through conduits 220′ into each of the housing segments 210′ of second housing 252, thus causing a jet stream 236′ to be discharged from each outlet 226′ of said second housing. Because of the flow direction of the fuel and oxidizer in each housing segment 210, 210′ and the radial alignment and shape of the outlets 226, 226′ thereof, each jet stream 236 impinges with one of the jet streams 236′. Each inlet 218, 218′ is provided with a leaf spring 224 corresponding in construction and function to leaf spring 24 of the embodiment of the invention illustrated in FIGURES 1, 2 and 3. However, if desired, leaf springs 224 could be replaced by baffles (not shown) of the same construction and function as baffle 140 of the embodiment of the invention illustrated in FIGURE 4. As will be understood from the foregoing description of the manner of operation of the fluid injector illustrated in FIGURES 1, 2 and 3, the point of impingement of the jet streams 236, 236′ within combustion chamber 270 can be controlled by varying the pressure of the fuel and oxidizer supplied to manifolds 262, 262′ respectively.

Various modifications can obviously be made in the above-described embodiments of the invention. For example, in the embodiment illustrated in FIGURES 5 and 6 and described immediately hereinabove, the toroidal housings 250, 252 can be formed as unitary members rather than with a plurality of housing segments 210, 210′. The interior of each torus can also be continuous rather than divided into a plurality of separate chambers as in the illustrated embodiment. Furthermore, means other than the leaf springs 24, 224 and baffles 140 could be employed to vary the flow area of the inlets 18, 118, 218, 218′ of the three illustrated embodiments of the invention. It is therefore to be understood that the scope of the invention is limited only by the terms of the appended claims.

What is claimed is:
1. A fluid injector comprising:
a first toroidal housing having a plurality of inlets extending through a wall thereof, said inlets being spaced around said first housing and disposed tangential thereto so that fluid injected therethrough is directed circumferentially of the inner surface of said first housing, a plurality of outlets extending through the wall of said first housing and respectively disposed in the paths of fluids injected into said first housing through said inlets therein, each of said outlets being shaped so that fluid discharged therethrough can be directed at different angles outwardly from said first housing;
a second toroidal housing concentrically disposed around said first housing and having a plurality of inlets extending through the wall thereof, said inlets being spaced around said second housing in radial alignment with respective ones of said inlets in said first housing and disposed tangential to said second housing so that fluid injected therethrough is directed circumferentially of the inner surface of the latter, a plurality of outlets extending through the wall of said second housing and respectively disposed in the paths of fluid injected into said second housing through said inlets therein, each of said outlets being shaped so that fluid discharged therethrough can be directed at different angles inwardly from said second housing and into impingement with fluid discharged from said outlets in said first housing; and
pressurizing, manifold and conduit means for injecting fluid under pressure through said inlets of said first and second housings.

2. A fluid injector as defined in claim 1 including flow control means disposed in each of said inlets of said first and second housings for varying the flow area thereof.

3. A fluid injector as defined in claim 2 wherein said flow control means comprises a leaf spring mounted within each of said inlets, said leaf spring being deflected to different angular positions relative to the longitudinal axis of said inlet as fluid pressure in the inlet is varied.

4. A fluid injector as defined in claim 2 wherein said flow control means comprises a baffle movably disposed within each of said inlets.

References Cited
UNITED STATES PATENTS 3,369,759   2/1968   Kast _____ 239—471

EVERETT W. KIRBY, *Primary Examiner.*

U.S. Cl. X.R.

239—471, 548, 567, 568